(12) United States Patent
Taguchi et al.

(10) Patent No.: US 9,067,606 B2
(45) Date of Patent: Jun. 30, 2015

(54) RAILCAR

(75) Inventors: Makoto Taguchi, Akashi (JP); Jin Kato, Shibuya-ku (JP); Aya Kojima, Shibuya-ku (JP); Keisuke Mizutani, Shibuya-ku (JP); Kenichi Koyama, Koto-ku (JP); Tetsuya Asaka, Yokohama (JP); Takashi Ono, Yokosuka (JP); Takashi Azuma, Kobe (JP)

(73) Assignees: EAST JAPAN RAILWAY COMPANY, Tokyo (JP); KAWASAKI JUKOGYO KABUSHIKI KAISHA, Kobe-Shi (JP); JAPAN TRANSPORT ENGINEERING COMPANY, Yokohama-Shi (JP)

( * ) Notice: Subject to any disclaimer, the term of this patent is extended or adjusted under 35 U.S.C. 154(b) by 33 days.

(21) Appl. No.: 14/000,271

(22) PCT Filed: Feb. 17, 2012

(86) PCT No.: PCT/JP2012/001059
§ 371 (c)(1),
(2), (4) Date: Dec. 27, 2013

(87) PCT Pub. No.: WO2012/111345
PCT Pub. Date: Aug. 23, 2012

(65) Prior Publication Data
US 2014/0150688 A1 Jun. 5, 2014

(30) Foreign Application Priority Data
Feb. 17, 2011 (JP) ................................ 2011-031681

(51) Int. Cl.
*B61D 17/00* (2006.01)
*B61D 17/04* (2006.01)
(Continued)

(52) U.S. Cl.
CPC .............. *B61D 17/00* (2013.01); *B61D 17/04* (2013.01); *B61D 33/00* (2013.01); *B61D 17/08* (2013.01); *B61D 17/12* (2013.01); *B61D 33/0057* (2013.01); *B61F 1/00* (2013.01); *Y02T 30/34* (2013.01)

(58) Field of Classification Search
CPC ........ B61D 17/00; B61D 17/08; B61D 17/04; B61D 17/041; B61D 17/10; B61D 17/18; B61D 17/12; B61D 33/00; B61D 33/0053; B61D 15/06; B61D 15/00; B61F 1/00
USPC .......................... 105/396, 404, 413–419, 422
See application file for complete search history.

(56) References Cited

U.S. PATENT DOCUMENTS 6,234,084 B1 * 5/2001 Neubauer et al. ............. 105/396
7,438,001 B2 * 10/2008 Nakamura et al. ............ 105/396
(Continued)

FOREIGN PATENT DOCUMENTS

JP   A-2000-264200   9/2000
JP   A-2007-126027   5/2007
(Continued)

OTHER PUBLICATIONS

May 22, 2012 International Search Report issued in International Patent Application No. PCT/JP2012/001059.

*Primary Examiner* — Jason C Smith
(74) *Attorney, Agent, or Firm* — Oliff PLC

(57) ABSTRACT

There is provided a railcar including a under frame, paired side bodyshell parts, and a roof bodyshell part. Strap bar receiving parts hanging downward from the roof bodyshell part are fixed to the roof bodyshell part. An upper horizontal member and a lower horizontal member are provided like bridges between the paired side bodyshell parts. The upper horizontal member and the lower horizontal member are disposed at an interval in a vertical direction and connected by connection pipes. The upper horizontal member is formed by a plurality of reinforcement pipes and the lower horizontal member is formed by a plurality of reinforcement pipes. At least one ends of the plurality of reinforcement pipes are fixed to the strap bar receiving parts.

9 Claims, 12 Drawing Sheets

(51) Int. Cl.
*B61D 33/00* (2006.01)
*B61D 17/08* (2006.01)
*B61D 17/12* (2006.01)
*B61F 1/00* (2006.01)

(56) References Cited

U.S. PATENT DOCUMENTS

| | | | |
|---|---|---|---|
| 2002/0069787 A1* | 6/2002 | Yono et al. | 105/413 |
| 2002/0157564 A1* | 10/2002 | Okuno et al. | 105/396 |
| 2012/0125225 A1* | 5/2012 | Matsuoka et al. | 105/396 |
| 2012/0199043 A1* | 8/2012 | Matsuoka et al. | 105/329.1 |
| 2013/0213259 A1* | 8/2013 | Taguchi et al. | 105/422 |
| 2013/0220169 A1* | 8/2013 | Taguchi et al. | 105/397 |
| 2014/0150688 A1* | 6/2014 | Taguchi et al. | 105/413 |

FOREIGN PATENT DOCUMENTS

| | | |
|---|---|---|
| JP | A-2007-161084 | 6/2007 |
| JP | A-2009-208763 | 9/2009 |
| JP | A-2010-052511 | 3/2010 |

* cited by examiner

Time history waveform of Y direction displacement (sec)

Time history waveform of volume variation (sec)

RAILCAR

TECHNICAL FIELD

The present invention relates to a railcar having a reinforcement structure for increasing rigidity of the railcar.

BACKGROUND ART

Conventionally, weight reduction has been promoted while increase in carbody strength is required in a railcar and a railcar having sufficient strength to bear an external force which is normally unexpected, for example, a load in a car width direction (lateral direction), is required. As an example of such a car, there are known carbody structures described in Patent Documents 1 and 2.

In the carbody structure in Patent Document 1, carline of roof bodyshell are aligned with and connected to upper ends of side posts and doorway posts and connected portions are reinforced with gussets. In the car structure in Patent Document 2, side bodyshell parts and a roof bodyshell part are connected to form a body portion and connection members are provided to corner portions where the side bodyshell parts and the roof bodyshell part are connected to each other. The connection members are coupled to the side bodyshell parts and the roof bodyshell part to reinforce the body portion.

PRIOR ART DOCUMENTS

Patent Documents

Patent Document 1: Japanese Patent Laid-open Publication No. 2007-126027
Patent Document 2: Japanese Patent Laid-open Publication No. 2007-161084

SUMMARY OF THE INVENTION

Problems to be Solved by the Invention

However, various interior trims are provided in a car interior and external dimensions of the gussets in Patent Document 1 and the connection members in Patent Document 2 may be restricted in some cases so that these members do not interfere with the interior trims. If the external dimensions of the gussets and the connection members are small, the carbody may be deformed to reduce a car interior space when a normally unexpected lateral load is applied.

The gussets in Patent Document 1 are provided to the connected portions where the side posts, the doorway posts, and the roof bodyshell part are connected and the connection members in Patent Document 2 are provided to the corner portions where the side bodyshell parts and the roof bodyshell part are connected. In other words, because both the gussets in Patent Document 1 and the connected portions in Patent Document 2 are mounted to the corners of the car interior, they are easy to apply to newly manufactured cars. However, they are difficult to apply to an existing car, because it is necessary to mount them after detaching the interior trims and the like.

Therefore, it is an object of the present invention to provide a railcar with increased carbody strength against a lateral load. Moreover, it is an object to provide a railcar including a reinforcement structure which can be easily applied to the existing car.

Solutions to the Problems

In order to solve this objects, a railcar according to an aspect of the present invention includes a under frame, paired side bodyshell parts respectively provided on opposite sides of the under frame in a car width direction, and a roof bodyshell part provided like a bridge between upper end portions of the paired side bodyshell parts, the railcar having a reinforcement structure. The reinforcement structure includes: hanging members having one ends fixed to the roof bodyshell part to extend downward from the roof bodyshell part; an upper horizontal member provided in an upper portion of a car interior and disposed like a bridge between the paired side bodyshell parts; a lower horizontal member provided in the upper portion of the car interior and disposed in a position displaced downward from the upper horizontal member like a bridge between the paired side bodyshell parts; and a connection member for connecting the upper horizontal member and the lower horizontal member. The upper horizontal member has a plurality of upper reinforcement members at least one ends of which are respectively connected to the hanging members and the lower horizontal member has a plurality of lower reinforcement members at least one ends of which are respectively connected to the hanging members.

According to the aspect of the present invention, the upper horizontal member and the lower horizontal member are provided like bridges between the paired side bodyshell parts, which enhances rigidity of the car against unexpected external force applied in the car width direction. Moreover, the upper horizontal member is formed by the plurality of upper reinforcement members, the lower horizontal member is formed by the plurality of lower reinforcement members, and at least one ends of the upper reinforcement members and the lower reinforcement members are fixed to the roof bodyshell part with the hanging members interposed therebetween, which suppresses bending of the upper horizontal member and the lower horizontal member in a longitudinal direction of the car. As a result, it is possible to further enhance the rigidity of the car against a load in the car width direction. In this way, deformation of the car due to the load in the car width direction can be suppressed and reduction in a volume of a passenger cabin in the car can be suppressed.

Furthermore, the reinforcement structure according to the aspect of the present invention is formed by providing the upper horizontal member and the lower horizontal member like bridges between the paired side bodyshell parts in the upper portion in the car interior, it can be easily mounted to an existing railcar. Especially, by utilizing the upper portion in the passenger cabin which is a relatively large and unused space, the reinforcement structure can be easily applied to the existing railcar.

Effects of the Invention

According to the aspect of the present invention, it is possible to provide the railcar with enhanced carbody strength against the lateral load. Moreover, it is possible to provide the railcar having the reinforcement structure which can be easily applied to the existing car.

The above objects and the other objects, features, and advantages of the present invention will become apparent from the following detailed description of preferred embodiments with reference to the accompanying drawings.

MODES FOR CARRYING OUT THE INVENTION

In the following description, a railcar (hereinafter simply referred to as "car" in some cases) 1 of a first embodiment according to the present invention will be described with reference to the above-described drawings. Concepts of directions in each embodiment correspond to concepts of directions in facing forward when a traveling direction of the car is defined as a forward direction. In other words, a car longitudinal direction (hereafter simply referred to as "longitudinal direction" in some cases) corresponds to a front-rear direction and a car width direction corresponds to a left-right direction. The railcar 1 described below is merely an embodiment of the present invention. In other words, the present invention is not limited to the following embodiment and additions to, deletions from, and modifications to the embodiment can be made without departing from the gist of the present invention.

First Embodiment

[Car]

Figure 1:
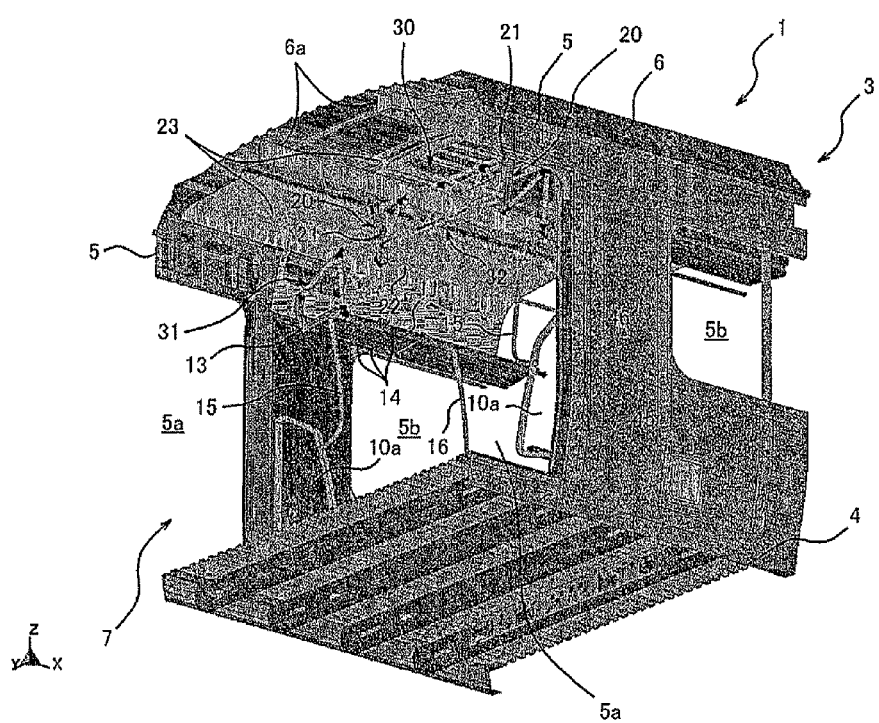
FIG. 1 is a perspective view of an essential portion of a railcar of a first embodiment according to the present invention.
Figure 2:
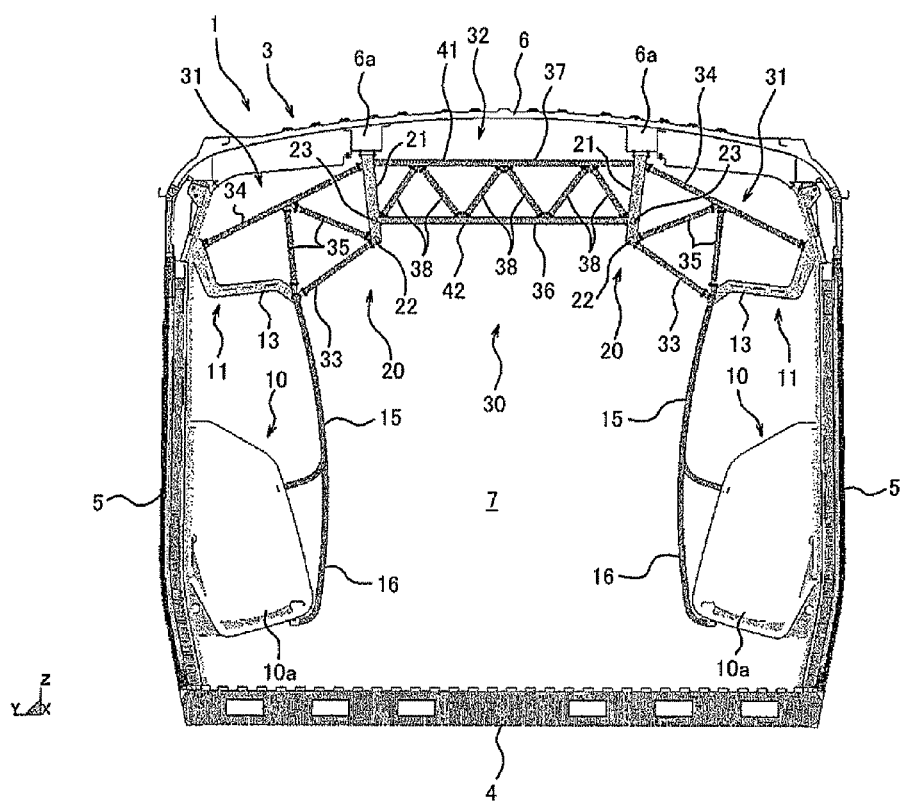
FIG. 2 is a sectional view of an essential portion of the railcar shown in FIG. 1.

A train is formed by connecting a plurality of cars 1 and the car 1 has two trucks (not shown) for traveling on a railroad track. A carbody 3 is placed on the two trucks with air springs (not shown) interposed therebetween and the carbody 3 has a under frame 4 at a bottom portion as shown in FIG. 1.

The under frame 4 is in a substantially rectangular shape which is long in the front-rear direction in a plan view and is placed on the two trucks with the air springs interposed therebetween. Side bodyshell parts 5 stand on opposite end portions in the car width direction of the under frame 4 so as to pair up with each other. A plurality of doorways 5a are formed at intervals in the car longitudinal direction in the side bodyshell parts 5 and windows 5b are formed between the doorways 5a. Paired end bodyshell parts (not shown) standing on the under frame 4 are respectively connected to front and rear opposite end portions of the paired side bodyshell parts 5 and a roof bodyshell part 6 is provided on the side bodyshell parts 5 and the end bodyshell parts. The roof bodyshell part 6 is provided like a bridge between the pair of left and right side bodyshell parts 5 to close a space surrounded with the under frame 4, the side bodyshell parts 5, and the end bodyshell parts. The carbody 3 formed in this manner is substantially formed in a shape of a hollow rectangular parallelepiped, i.e., a box shape, by the under frame 4, the pair of side bodyshell parts 5, the pair of end bodyshell parts, and the roof bodyshell part 6 and a passenger cabin 7 for accommodating passengers is formed in the carbody 3. In the passenger cabin 7 which is a car interior, a plurality of seat members 10, a plurality of luggage shelves 11, and a plurality of strap attachments 20 are disposed.

Each of the seat members 10 has a pair of partitioning frames 10a serving as wind screens at its longitudinal opposite end portions. A long seat portion (not shown) extending in the longitudinal direction is provided like a bridge between the paired partitioning frames 10a so that the passengers can sit on the long seat portion. The seat members 10 formed in this manner are provided to the respective side bodyshell parts 5 with interior panels (not shown) interposed therebetween and are respectively disposed between the end bodyshell parts and the doorways 5a and between the two doorways 5a. On the side bodyshell part 5 provided with the seat members 10 in this manner, the luggage shelves 11 are disposed above the seat members 10 with the window portions 5b interposed therebetween.

Each of the luggage shelves 11 extends in the longitudinal direction and has a pair of luggage shelf receiving parts 13. The luggage shelf receiving parts 13 are plate-shaped members substantially in L shapes and are disposed to face each other at longitudinal opposite end portions of the luggage shelf 11. Each of the luggage shelf receiving parts 13 has a base end portion 13a and a horizontal portion 13b. The base end portion 13a is fixed at its upper end portion to a portion of the side bodyshell parts 5 near each door end post 46 and extends diagonally downward from there toward a central portion of the car 1 in the car width direction. Although it is not shown, the upper end portion of the base end portion 13a is fastened to an internal frame mounted near a window header of the side bodyshell part 5 with the interior panel interposed therebetween. The horizontal portion 13b is connected to a lower end portion of the base end portion 13a and extends in the car width direction from the lower end portion of the base end portion 13a toward the central portion of the car in the car width direction. A plurality of pipe members 14 are provided like bridges between the horizontal portions 13b and are disposed parallel to each other at intervals in the car width direction. Luggage and the like can be placed on the pipe members 14 of the luggage shelf 11.

The luggage shelves 11 formed in this manner are respectively provided to the paired side bodyshell parts 5 and one luggage shelf 11 is provided to correspond to each of the seat members 10. The paired luggage shelf receiving parts 13 of the luggage shelf 11 are respectively disposed in planes substantially orthogonal in the longitudinal direction to the paired partitioning frames 10a of the seat member 10 and a first hand pole 15 is provided to the luggage shelf receiving part 13 and the partitioning frame 10a disposed in the same plane and the first hand pole 15 connects them.

The first hand pole 15 which is a rod-shaped member is the rod-shaped member extending in the vertical direction and has an upper end portion fixed to a tip end of the horizontal portion 13b of the luggage shelf receiving part 13 and a lower end portion fixed to a side face of the partitioning frame 10a in the car width direction. At a longitudinal intermediate portion of the luggage shelf 11, a second hand pole 16 is provided. The second hand pole 16 which is a rod-shaped member is fixed to the pipe member 14 of the luggage shelf 11 to extend downward and has a lower end portion fixed to a lower end portion of the long seat portion. In this manner, the seat member 10 and luggage shelf 11 are connected by the two hand poles 15 and 16 and the seat member 10 and the luggage shelf 11 connected to each other are disposed on each side (at about 600 mm, for example, from the center in the car width direction) of the passenger cabin 7 in the car width direction. At an intermediate portion of the passenger cabin 7 in the car width direction, paired strap attachments 20 are disposed in an upper space.

The paired strap attachments 20 are fixed to the roof bodyshell part 6 and respectively disposed at an interval on opposite sides in the car width direction. Each of the strap attachments 20 has a pair of strap bar receiving parts 21 and a first strap bar 22. Each of the strap bar receiving parts 21 which is a hanging member is a member extending in the vertical direction and positioned in the same plane as the luggage shelf receiving part 13 and the partitioning frame 10a. An upper end portion of the strap bar receiving part 21 is fixed to the roof bodyshell part 6. To put it more specifically, the upper end portion of the strap bar receiving part 21 is mounted to a ceiling frame 6a attached to an inner side of the roof bodyshell part 6 and extending in the longitudinal direction. On the other hand, the first strap bar 22 is provided to lower end portions of the strap bar receiving parts 21. The first strap bar 22 is a rod-shaped member extending in the longitudinal direction and provided like a bridge between the paired strap bar receiving parts 21. A plurality of straps (not shown) are provided, at intervals in the longitudinal direction, to the strap bar receiving part 21 provided like the bridge in this manner.

The paired strap attachments 20 formed in this manner are disposed at an interval in the longitudinal direction and a second strap bar 23 is provided like a bridge between the strap attachments 20 adjacent to each other in the longitudinal direction. The second strap bar 23 is a rod-shaped member extending in the longitudinal direction similarly to the first strap bar 22 and is provided with a plurality of straps at intervals in the longitudinal direction. To put it more specifically, the second strap bar 23 is provided near the lower end portions of the strap bar receiving parts 21 and in a higher position than the first strap bar 22 so that the straps (not shown) do not hinder passengers coming in and going out through the doorways 5a. The paired strap attachments 20 formed in this manner form a reinforcement structure 30 together with the seat members 10 and the luggage shelves 11.

[Reinforcement Structure]

The reinforcement structure 30 includes two first reinforcement structure parts 31 and a second reinforcement structure part 32. Each of the first reinforcement structure parts 31 is provided like a bridge between the luggage shelf 11 and the strap attachment 20 adjacent to the luggage shelf 11 and has two reinforcement pipes 33 and 34 and a plurality of connection pipes 35.

The reinforcement pipes 33 and 34 are stainless steel pipes or stainless clad pipes formed by winding stainless steel around iron pipes. The two reinforcement pipes 33 and 34 extend diagonally upward from the luggage shelf 11 toward the adjacent strap attachment 20 and are provided like bridges between the luggage shelf receiving part 13 of the luggage shelf 11 and the strap bar receiving part 21 of the strap attachment 20 to be parallel to each other and at an interval in the vertical direction. To put it more specifically, the lower reinforcement pipe 33 which is the first lower reinforcement member has one end connected to the lower end portion of the strap bar receiving part 21 and the other end connected to the tip end portion of the horizontal portion 13b of the luggage shelf receiving part 13. The upper reinforcement pipe 34 which is the first upper reinforcement member has one end connected to a portion near the upper end portion of the strap bar receiving part 21 and the other end connected to the upper end portion of the base end portion 13a of the luggage shelf receiving part 13. The plurality of connection pipes 35 are disposed between the two reinforcement pipes 33 and 34 provided like bridges in this manner. In the embodiment, the two connection pipes 35 are disposed.

The connection pipes 35 which are connecting members connect the two reinforcement pipes 33 and 34. To put it more specifically, the two connection pipes 35 have lower end portions respectively connected to the tip end portion of the horizontal portion 13b of the luggage shelf receiving part 13 and the lower end portion of the strap bar receiving part 21 and upper end portions connected to substantially the same position of the upper reinforcement pipe 34. In other words, the two connection pipes 35 form triangles between the two reinforcement pipes 33 and 34 to form a truss structure together with the luggage shelf receiving part 13 and the strap bar receiving part 21. The second reinforcement structure part 32 is provided to the strap bar receiving parts 21.

The second reinforcement structure part 32 is provided like a bridge between the paired strap attachments 20 and has two reinforcement pipes 36 and 37 and a plurality of connection pipes 38. The reinforcement pipes 36 and 37 are stainless steel pipes or stainless clad pipes formed by winding stainless steel around iron pipes extending in the car width direction. The reinforcement pipes 36 and 37 are provided like bridges between the strap bar receiving parts 21 of the paired strap attachments 20 to be parallel to each other and at an interval in the vertical direction. The upper reinforcement pipe 37 which is a second upper reinforcement member has opposite end portions respectively connected to portions near the upper end portions of the strap bar receiving parts 21 and the lower reinforcement pipe 36 which is a second lower reinforcement member has opposite end portions connected to the lower end portions of the strap bar receiving parts 21. The plurality of connection pipes 38 are disposed between the two reinforcement pipes 36 and 37 disposed at the interval in the vertical direction in this manner. In the embodiment, the six connection pipes 38 are disposed between the two reinforcement pipes 36 and 37.

The connection pipes 38 which are connection members connect the two reinforcement pipes 36 and 37. The six connection pipes 38 are disposed to form a plurality of triangles between the two reinforcement pipes 36 and 37 to form a truss structure together with the reinforcement pipes 36 and 37 and the paired strap bar receiving parts 21.

In the reinforcement structure 30 formed in this manner, the upper reinforcement pipe 34 of the first reinforcement structure part 31 and the upper reinforcement pipe 37 of the second reinforcement structure part 32 are connected to each other by the strap bar receiving part 21 to thereby form an upper horizontal member 41 and the lower reinforcement pipe 33 of the first reinforcement structure part 31 and the lower reinforcement pipe 36 of the second reinforcement structure part 32 are connected to each other by the strap bar receiving part 21 to thereby form a lower horizontal member 42. Both the upper horizontal member 41 and the lower horizontal member 42 formed in this manner are provided like bridges between the paired side bodyshell parts 5 with the luggage shelves 11 interposed therebetween and intermediate portions in the car width direction of the upper horizontal member 41 and the lower horizontal member 42 are fixed to the roof bodyshell part 6 by the paired strap bar receiving parts 21. The upper horizontal member 41 and the lower horizontal member 42 are connected to each other by the strap bar receiving parts 21 and the plurality of connection pipes 35 and 38 to form a truss structure together with the luggage shelves 11, the strap bar receiving parts 21, and the plurality of connection pipes 35 and 38.

In the reinforcement structure 30 formed in this manner, the upper horizontal member 41 and the lower horizontal member 42 are provided like bridges between the one side bodyshell part 5 and the other side bodyshell part 5 with the luggage shelves 11 interposed therebetween, which enhances rigidity of the carbody 3 in the car width direction. Moreover, at least one ends of the reinforcement pipes 33, 34, 35, and 36 respectively forming the upper horizontal member 41 and the lower horizontal member 42 are fixed to the roof bodyshell part 6 with the strap bar receiving parts 21 interposed therebetween, which prevents the upper horizontal member 41 and the lower horizontal member 42 from bending in the longitudinal direction. In other words, it is possible to suppress bending of the reinforcement structure 30 in the longitudinal direction to thereby further enhance the rigidity of the carbody 3 in the car width direction.

In the reinforcement structure 30, the reinforcement pipes 33 and 34 of each of the first reinforcement structure parts 31 extend in inclined directions with respect to the roof bodyshell part 6 and the side bodyshell part 5 between them to thereby connect the roof bodyshell part 6 and the side bodyshell part 5. In this way, a load applied on the side bodyshell part 5 in the car width direction can be distributed to the roof bodyshell part 6, which also enhances rigidity of the carbody 3.

The first reinforcement structure part 31 is disposed diagonally between the roof bodyshell part 6 and the side bodyshell part 5, which suppresses movement of the roof bodyshell part 6 and the side bodyshell part 5 away from and toward each other at their junction and enhances rigidity of an area around the junction between the roof bodyshell part 6 and the side bodyshell part 5. In other words, it is possible to suppress deformation of a rectangular sectional shape of the car 1 into a parallelogram to thereby suppress reduction in a volume of the passenger cabin 7 due to the deformation of the car 1.

The second reinforcement structure part 32 is disposed between the two first reinforcement structure parts 31 disposed on left and right opposite sides, which suppresses movement of the two first reinforcement structure parts 31 closer to each other to thereby suppress compression of the car 1 in the car width direction. In this way, it is possible to suppress reduction in the volume of the passenger cabin 7 due to the compression of the car 1 in the car width direction.

Furthermore, by forming the truss structure, it is possible to further enhance the rigidity of the carbody 3 while suppressing increase in weight of the reinforcement structure 30. In this way, it is possible to further suppress reduction in the volume of the passenger cabin 7. Moreover, by forming the reinforcement structure 30 by the truss structure, provision of the reinforcement structure 30 of the passenger cabin 7 does not impair a ventilation characteristic in the passenger cabin 7. Furthermore, the luggage shelves 11 and the strap bar receiving parts 21 are used as parts of the truss structure, which suppresses the number of parts to suppress increase in weight of the car and increase in manufacturing cost.

The reinforcement structure 30 is disposed by efficiently utilizing the upper space of the passenger cabin 7 and therefore the reinforcement structure 30 can be increased in size as compared with the prior-art reinforcement structure. In this way, it is possible to form the reinforcement structure 30 having large external dimensions. Because the reinforcement structure 30 utilizes the upper space in the passenger cabin 7 which is a relatively large and unused space, the reinforcement structure 30 is easy to mount to an existing railcar. Especially, the luggage shelves 11 and the strap bar receiving parts 21 are utilized for the reinforcement structure 30 to thereby suppress the increase in the number of parts and avoid structural restrictions imposed on the reinforcement structure 30 by interior trims of the passenger cabin 7 such as the luggage shelves 11 and the strap bar receiving parts 21.

Second Embodiment

A car 1A in the second embodiment has a similar structure to the car 1 in the first embodiment. In the following description of the structure of the car 1A in the second embodiment, only structures different from those in the car 1 in the first embodiment will be described and the same structures will be provided with the same reference numerals and will not be described. A structure of a car 1B in the third embodiment will be described in the same manner.

Figure 3:
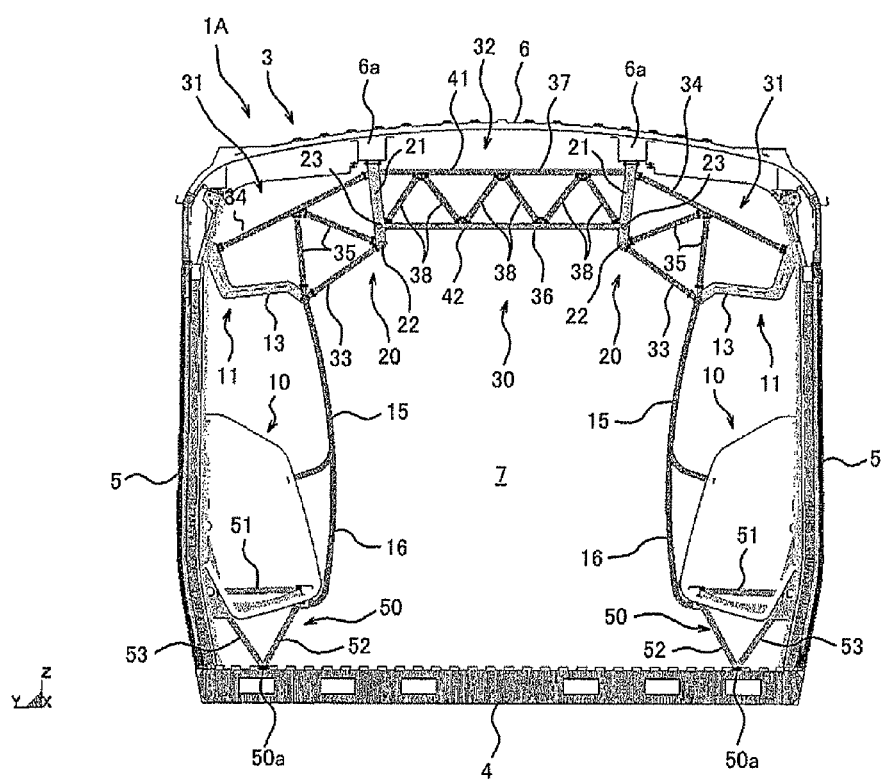
FIG. 3 is a sectional view of a railcar of a second embodiment according to the present invention.

In the car 1A in the second embodiment, a reinforcement structure 30 has a pair of third reinforcement structure parts 50 as shown in FIG. 3. Each of the third reinforcement structure parts 50 is disposed between a seat member 10 and a under frame 4 and connects the seat member 10 and the under frame 4. To put it more specifically, the third reinforcement structure part 50 is a frame body having an inverted triangular sectional shape and formed by three pipes 51 to 53 and the pipe 51 forming an upper side is fixed to a lower face of the seat member 10. A frame supporting a long seat of the seat member 10 may be used as a substitute for the pipe 51. A lower end portion 50a which is a junction between the other two pipes 52 and 53 is connected to the under frame 4.

The third reinforcement structure part 50 formed in this manner is connected to a second hand pole 16 as well. In this way, a load transmitted from the side bodyshell part 5 to the luggage shelf 11 can be distributed to the second hand pole and relieved by the third reinforcement structure part 50 to the under frame 4. In other words, the load applied on the side bodyshell part 5 in a car width direction can be distributed to the under frame 4, which enhances rigidity of a carbody 3 in the car width direction. Moreover, the third reinforcement structure part 50 is disposed between the seat member 10 and the under frame 4, which enhances rigidity of the carbody 3 in a vertical direction.

The car 1A in the second embodiment has other similar effects to the car 1 in the first embodiment.

Third Embodiment

Figure 4:
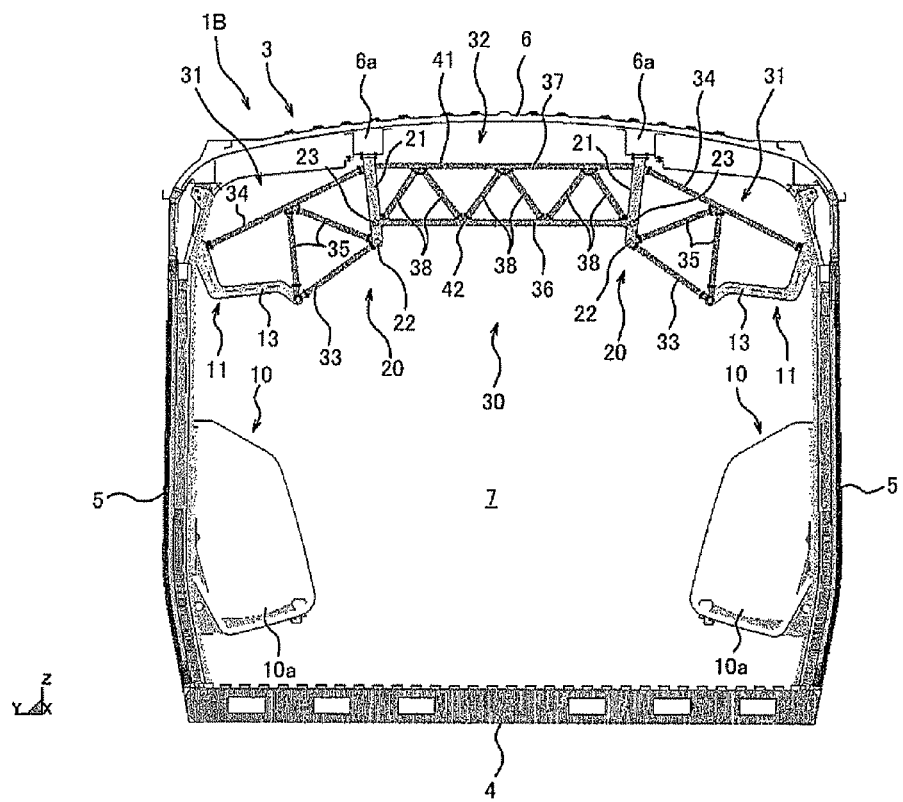
FIG. 4 is a sectional view of a railcar of a third embodiment according to the present invention.

The car 1B in the third embodiment is different from the car 1 in the first embodiment in that it does not have the first hand poles 15 and the second hand poles 16 as shown in FIG. 4 and that no member is disposed between each of the seat members 10 and each of the luggage shelves 11.

If the first hand poles 15 and the second hand poles 16 are not provided in this manner, similar effects to those of the car 1 in the first embodiment can be exerted, though rigidity is reduced as compared with the car 1 in the first embodiment.
[Analyses Related to Reinforcing Effects]

Figure 5:
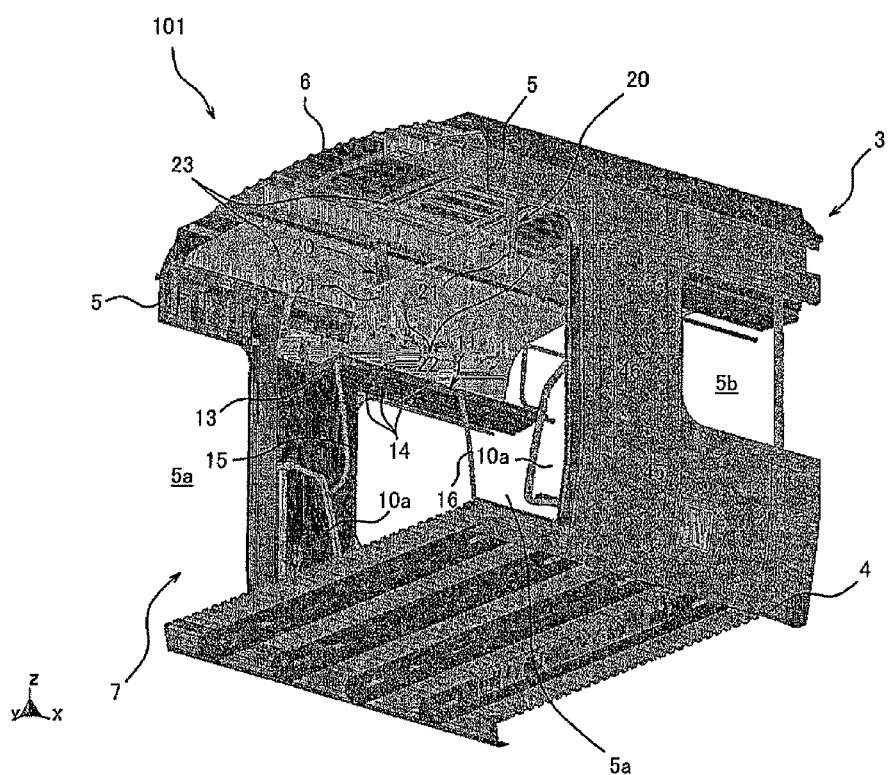
FIG. 5 is a perspective view of an essential portion of a prior-art railcar.
Figure 6:
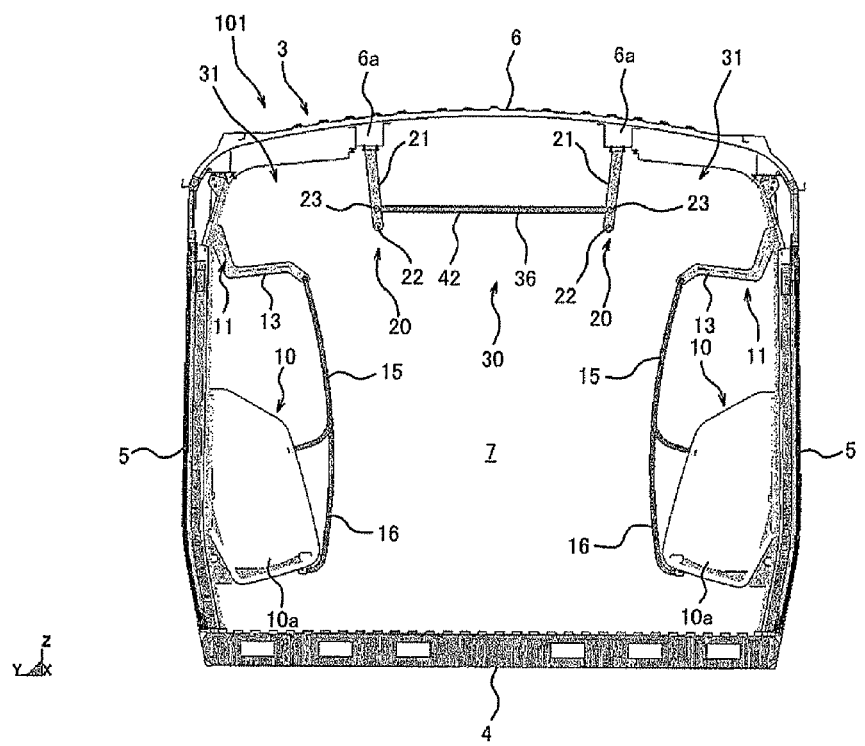
FIG. 6 is a sectional view of an essential portion of the prior-art railcar shown in FIG. 5.

FEM analyses (used program: LS-DYNA MPP ver. 971 (64-bit version)) made to prove reinforcing effects of the cars 1, 1A, and 1B in the first to third embodiments will be described below. FEM analyses were made for a car 101 shown in FIGS. 5 and 6 and a car (not shown) formed by mounting only the third reinforcement structure parts 50 to the car 101 as cars to be compared with the car 1 in the embodiment. The car 101 has a substantially similar structure to the car 1 except that it does not have the reinforcement structure 30 and the same structures will be provided with the same reference numerals and will not be described.

(Analysis Conditions)

Figure 7A:
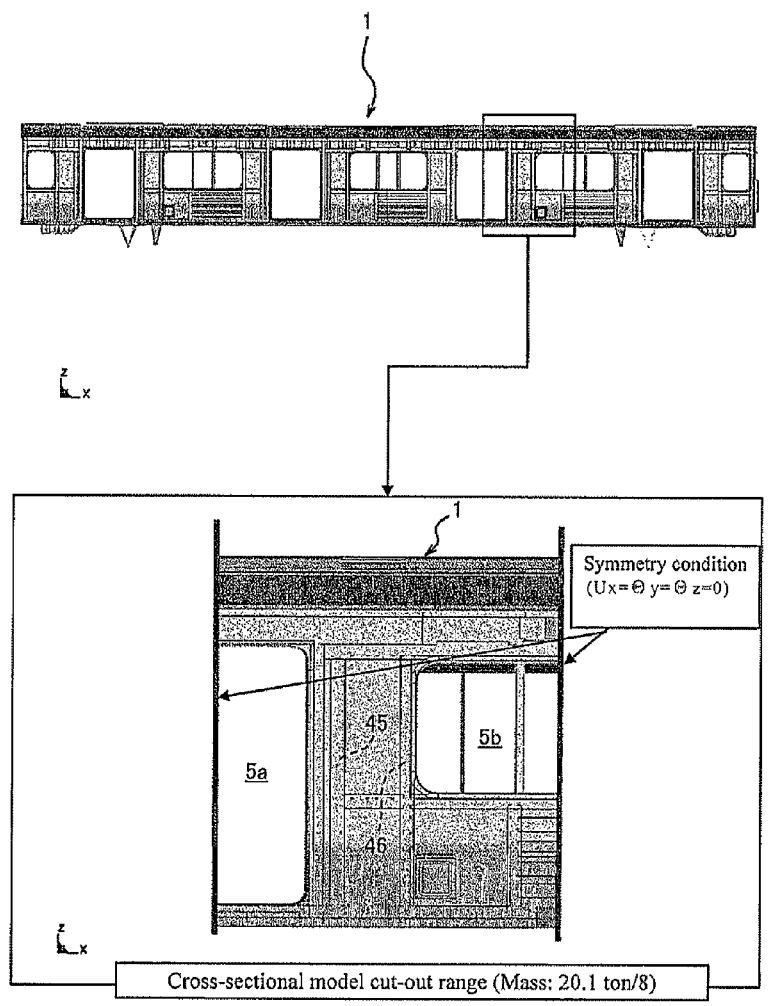
FIG. 7A is a drawing showing a cut-out range of an analysis model.
Figure 7B:
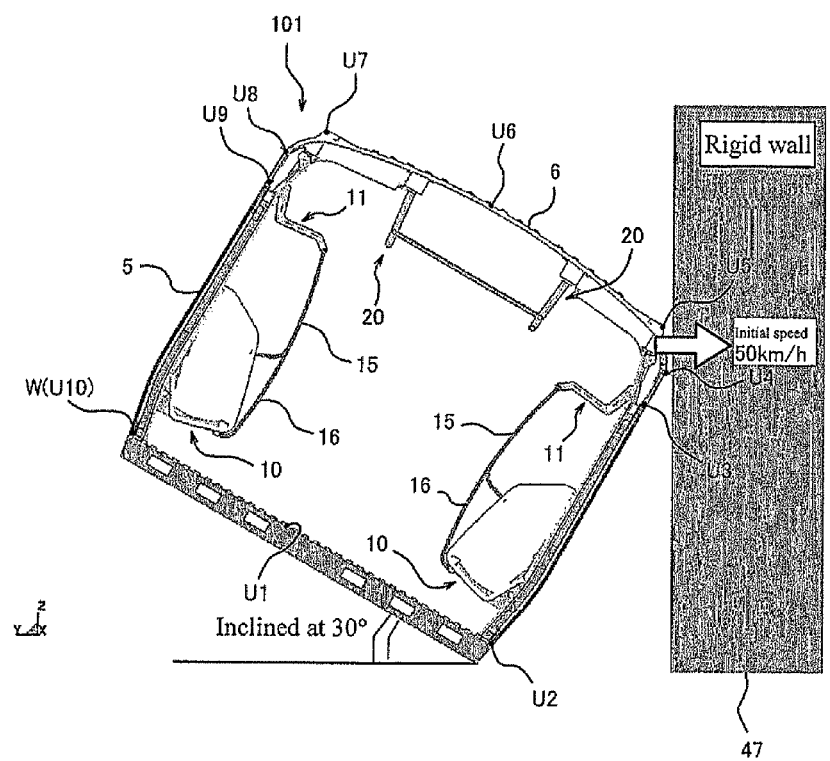
FIG. 7B is a drawing showing collision conditions in analysis in the analysis model in FIG. 7A.

Each of analytical models used for the FEM analyses is a part cut out of the car as shown in FIG. 7A. To put it more specifically, the analytical model is the part from a center of a doorway 5a to a center of an adjacent window 5b cut out of the car in the longitudinal direction and includes a door tip post 45 and a door end post 46. Each of the FEM analyses was made on conditions that the car collided with a rigid wall 47 at an initial speed of 50 km/h in a Y direction while inclined at an angle of 30° as shown in FIG. 7B.

(Analysis Results)

Figure 8:
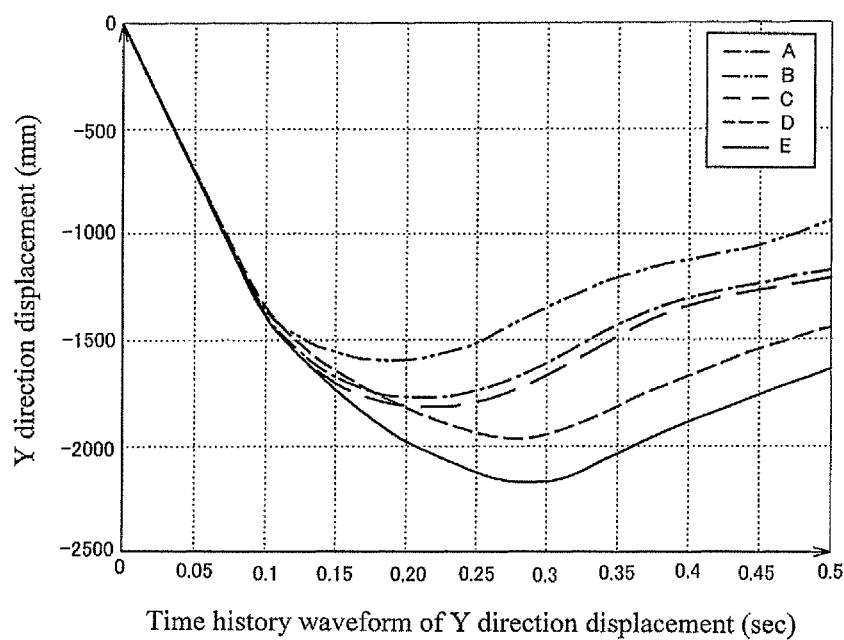
FIG. 8 is a graph showing variation with time of a displacement of a predetermined point W in each analysis model.
Figure 9:
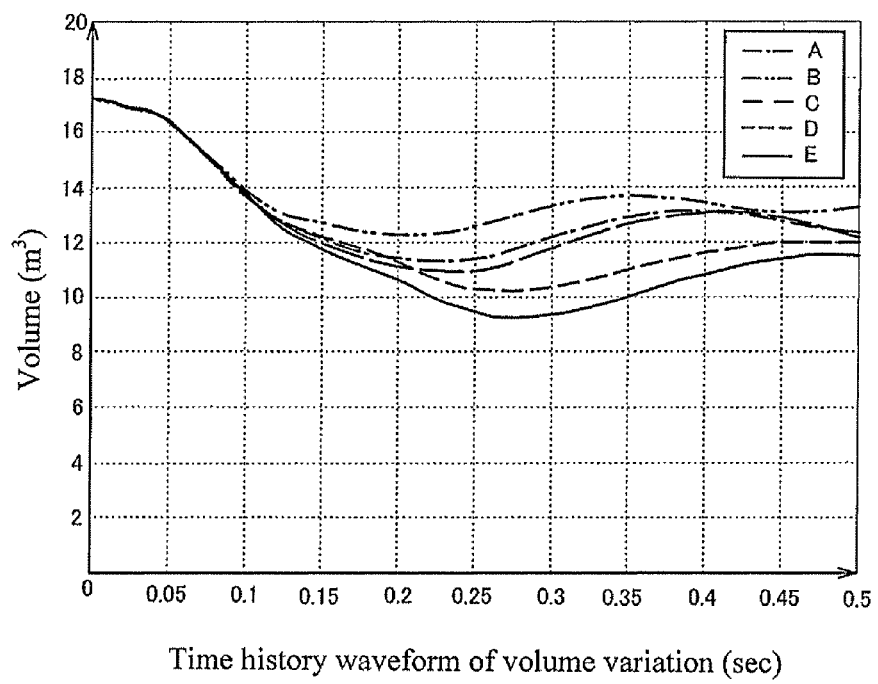
FIG. 9 is a graph showing variation with time of a volume of a passenger cabin in each analysis model.

FIGS. 8 and 9 show analysis results obtained by the above-described FEM analyses. First, the analysis results shown in FIG. 8 will be described. FIG. 8 shows variation with time of a Y direction displacement of a point W (see FIG. 7B) of a section taken near the door end post 46 which is the farthest from the rigid wall 47, and more concretely, the Y direction displacement of a point W (i.e., the displacement of the car width direction, and direction farther from the rigid wall 47 is set to the positive direction) where the under frame 4 and the door end post 46 are connected. In a graph in FIG. 8, a vertical axis represents the displacement (an upward direction corresponds to a positive direction) and a horizontal axis represents elapsed time. FIG. 9 shows variation with time of the volume in the passenger cabin 7 in each analysis model. Analysis results shown in FIG. 9 were obtained by setting sectional area measurement points U1 to U10 shown in FIG. 7B in respective sections taken at a central position of the doorway, a position of the door tip post, a position of the door end post, and a central position of the window and analyzing the volume of the passenger cabin 7 based on these ten sectional area measurement points. In the graph in FIG. 9, a vertical axis represents the volume and a horizontal axis represents the elapsed time. In FIGS. 8 and 9, one-dot chain lines A show the analysis results related to the car 1 in the first embodiment, two-dot chain lines B show the analysis results of the car 1A in the second embodiment, and long broken lines C show the analysis results of the car 1B in the third embodiment. Broken lines D show the analysis results of the car in which the first reinforcement structure parts 31 and the second reinforcement structure part 32 are removed and only the third reinforcement structure parts 50 are employed and solid lines E show the analysis results of the prior-art car 101.

As can be seen from the analysis results in FIG. 8, as compared with the Y direction displacement of the prior-art car 101, the Y direction displacements of the cars 1, 1A, and 1B in the first to third embodiments are apparently smaller, which shows that the reinforcement structure 30 can suppress an amount of deformation of the carbody 3.

Next, if the three embodiments are compared with each other, the Y direction displacement of the car 1A in the second embodiment having the third reinforcement structure parts 50 is the smallest, which shows that having the first to third reinforcement structure parts 31, 32, and 50 can suppress deformation of the carbody 3 the most. On the other hand, although the Y direction displacement of the car 1B in the third embodiment is slightly smaller than that of the car 1 in the first embodiment, a difference between them is small, which shows that only the first reinforcement structure parts 31 and the second reinforcement structure part 32 without the first hand poles 15 and the second hand poles 16 can suppress the deformation of the carbody 3. In the car which employs only the third reinforcement structure parts 50, the effect of suppressing the deformation of the carbody 3 is smaller than in the cars 1, 1A, and 1B in the first to third embodiments, though the deformation of the carbody 3 can be suppressed more than in the prior-art car 101.

As can be seen from the analysis result in FIG. 9, a reduction in the volume of the passenger cabin 7 is apparently smaller in the cars 1, 1A, and 1B in the first to third embodiments as compared with a reduction in the volume of the passenger cabin 7 in the prior-art car 101, which shows that the reinforcement structure 30 can suppress the reduction in the volume of the passenger cabin 7.

Next, if the three embodiments are compared with each other, the reduction in the volume of the passenger cabin 7 in the car 1A in the second embodiment having the third reinforcement structure parts 50 is the smallest, which shows that having the first to third reinforcement structure parts 31, 32, and 50 suppresses the amount of deformation of the cars 1, 1A, and 1B the most. On the other hand, although the reduction in the volume of the passenger cabin 7 in the car 1B in the third embodiment is slightly smaller than that in the car 1 in the first embodiment, a difference between them is small, which shows that only the first reinforcement structure parts 31 and the second reinforcement structure part 32 without the first hand poles 15 and the second hand poles 16 can suppress the reduction in the volume of the passenger cabin 7. In the car which employs only the third reinforcement structure parts 50, the effect of suppressing the reduction in the volume of the passenger cabin 7 is smaller than those in the cars 1, 1A, and 1B in the first to third embodiments, though the reduction in the volume of the passenger cabin 7 can be suppressed more than in the prior-art car 101.

As described above, in each of the ears 1, 1A, and 1B in the first to third embodiments, having the reinforcement structure 30 can enhance the rigidity of the carbody 3 and suppress the reduction in the volume of the passenger cabin 7. As can be seen from the above-described analysis results, although the third reinforcement structure parts 50 alone do not exert large reinforcement effects, the third reinforcement structure parts 50 can exert larger reinforcement effects when they are used together with the first reinforcement structure parts 31 and the second reinforcement structure part 32. Moreover, provision of the first hand poles 15 and the second hand poles 16 can slightly suppress the amount of deformation of the carbody 3 and the reduction in the volume of the passenger cabin 7 as well.

<First Variation>

Figure 10:
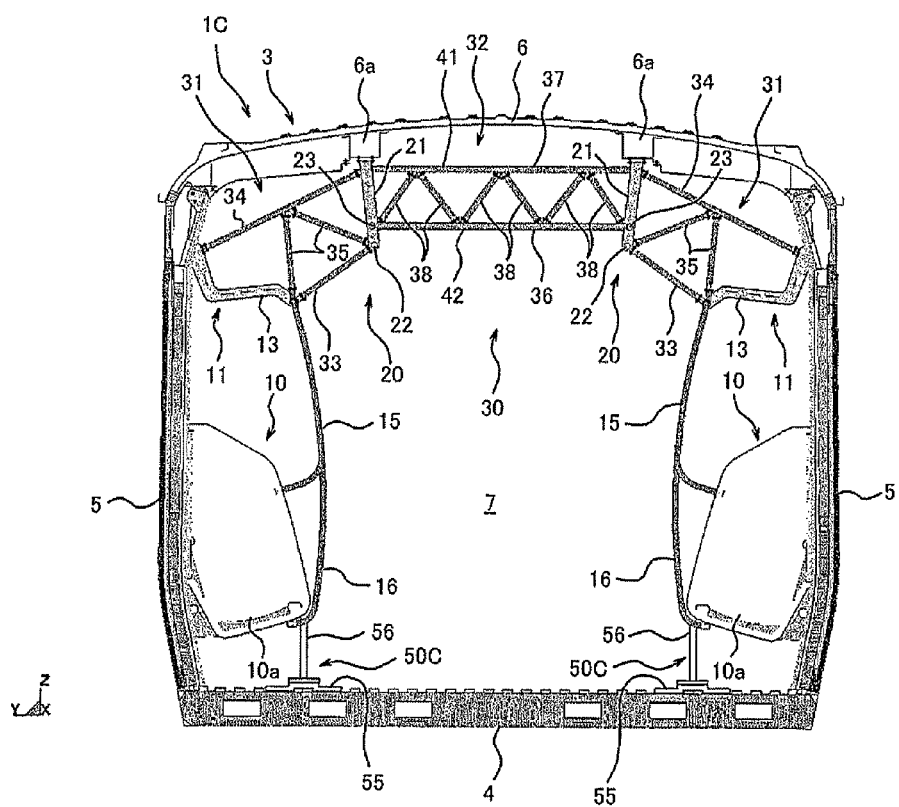
FIG. 10 is a sectional view of a railcar of a first variation related to the second embodiment according to the present invention.

A car 1C of a first variation shown in FIG. 10 is a variation of the car 1A of the second embodiment and third reinforcement structures 50C are employed in place of the third reinforcement structure parts 50. In the following description of a structure of the car 1C of the first variation, only structures of the third reinforcement structures 50C which are different points from the car 1A of the second embodiment will be described and the same structures will be provided with the same reference numerals and will not be described. A structure of a car 1D in a second variation will be described in the same manner.

Each of the third reinforcement structure parts 50C has a floor joist 55 and a pipe member 56. The floor joist 55 is a member extending in a longitudinal direction and having a hat-shaped section and is fixed onto the under frame 4. The pipe member 56 which is a first support member stands on the floor joist 55 and connects the floor joist 55 and a second hand pole 16.

The third reinforcement structure parts 50C formed in this manner can enhance the rigidity of the carbody 3 in a car width direction and a vertical direction similarly to the third reinforcement structure parts 50 in the car 1A in the second embodiment.

The car 1C of the first variation exerts other similar effects to the car 1A of the second embodiment.

<Second Variation>

Figure 11:
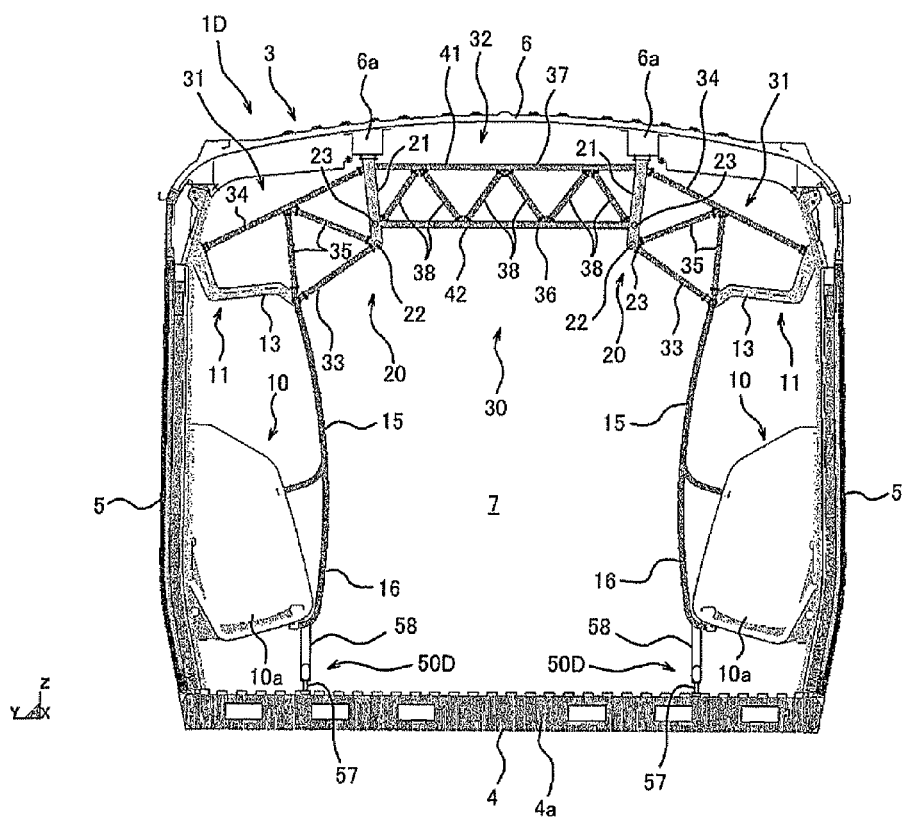
FIG. 11 is a sectional view of a railcar of a second variation related to the second embodiment according to the present invention.

Each of third reinforcement structure parts 50D of the car 1D of the second variation shown in FIG. 11 has a pipe receiving part 57 and a pipe member 58. The pipe receiving part 57 is a receiving member extending in a vertical direction and fixed onto a cross beam 4a of a under frame 4. The pipe member 58 which is a second support member stands on the pipe receiving part 57 to connect the pipe receiving part 57 and a second hand pole 16.

The car 1D of the second variation exerts similar effects to the car 1C in the first variation.

Other Embodiments

Although the first reinforcement structure parts 31 and the second reinforcement structure part 32 form the truss structure in each of the first to third embodiments, the structure is not necessarily restricted to the truss structure. For example, connection pipes 35 may not be provided or may be disposed in the vertical direction to form a ladder-shaped structure.

Although the luggage shelves 11 and the strap bar receiving parts 21 are utilized to form the reinforcement structure 30 in each of the first to third embodiments, the reinforcement structure 30 may be formed without utilizing the luggage shelves 11 and the strap bar receiving parts 21. For example, the reinforcement pipes 33 and 34 of the first reinforcement structures 31 may be directly provided to the side bodyshell parts 5, fixing members different from the strap bar receiving parts 21 may hang from the roof bodyshell part 6, and the reinforcement pipes 33 and 34 may be fixed to the fixing members. Alternately, other components having such functions as to replace the luggage shelves 11 and the strap bar receiving parts 21 may be used to form the reinforcement structure. In this way, the reinforcement structure 30 can be formed in a car without luggage shelves 11 and strap bar receiving parts 21.

Although the rod-shaped members are used as the respective reinforcement pipes and connection pipes in each of the first to third embodiments, the reinforcement pipes and the connection pipes are not restricted to them. Reinforcement members having various shapes such as rectangular and U sectional shapes may be used. The connection members for connecting the reinforcement members may be plate-shaped members.

From the above description, many modifications to and other embodiments of the present invention are apparent to a person skilled in the art. Therefore, the above description should be merely interpreted as examples and was given to teach the person skilled in the art the best modes for carrying out the present invention. Details of the structures and/or functions of the present invention can be substantially changed without departing from the spirit of the present invention.

DESCRIPTION OF REFERENCE SIGNS 1 to 1D: Car
3: Carbody
4: Under frame
5: Side bodyshell part
6: Roof bodyshell part
7: Passenger Cabin
10: Seat member
11: Luggage shelf
15: First hand pole
16: Second hand pole
21: Strap bar receiving part
30: Reinforcement structure
41: Upper horizontal member
42: Lower horizontal member
50, 50C, 50D: Third reinforcement structure part

The invention claimed is:

1. A railcar including a under frame, paired side bodyshell parts respectively provided on opposite sides of the under frame in a car width direction, a roof bodyshell part provided to bridge between upper end portions of the paired side bodyshell parts, and an end bodyshell part, the railcar having a reinforcement structure,
   wherein the reinforcement structure includes
   hanging members having one ends fixed to the roof bodyshell part to extend downward from the roof bodyshell part,
   an upper horizontal member provided in an upper portion of a car interior and disposed to bridge between the paired side bodyshell parts;
   a lower horizontal member provided in the upper portion of the car interior and disposed in a position displaced downward from the upper horizontal member to bridge between the paired side bodyshell parts, and
   a connection member for connecting the upper horizontal member and the lower horizontal member,
   wherein the upper horizontal member has a plurality of upper reinforcement members at least one ends of which are respectively connected to the hanging members,
   the lower horizontal member has a plurality of lower reinforcement members at least one ends of which are respectively connected to the hanging members, and
   the plurality of upper reinforcement members and the plurality of lower reinforcement members constitute first reinforcement structure parts disposed diagonally in a vertical direction and a second reinforcement structure part disposed horizontally, one of the first reinforcement structure parts being located between the roof bodyshell part and one of the paired side bodyshell parts, an other first reinforcement structure part being located between the roof bodyshell part and the other side bodyshell part.

2. The railcar including the reinforcement structure according to claim 1, wherein the plurality of connecting members are provided between the upper horizontal member and the lower horizontal member.

3. The railcar including the reinforcement structure according to claim 2, wherein the plurality of connecting members form a truss structure together with the upper horizontal member and a lower horizontal member.

4. The railcar including the reinforcement structure according to claim 2 further including luggage shelves respectively provided to the paired side bodyshell parts and extending in a longitudinal direction of the car,
   the one of the first reinforcement structure parts includes a first upper reinforcement member and a first lower reinforcement member each having one end fixed to the hanging member and the other end fixed to the luggage shelves and a first connection member for connecting the first upper reinforcement member and the first lower reinforcement member,
   the other side of the second reinforcement structure parts includes a second upper reinforcement member and a second lower reinforcement member each having opposite ends respectively connected to the hanging members and to the luggage shelves, and a second connection member for connecting the second upper reinforcement member and the second lower reinforcement member, and the respective luggage shelves form a truss structure together with the first reinforcement structure parts and the second reinforcement structure parts.

5. The railcar including the reinforcement structure according to claim 4,
   wherein the reinforcement structure further includes
   seat members positioned below the respective luggage shelves and respectively provided to the paired side bodyshell parts,
   a rod-shaped member for connecting the luggage shelf and the seat member, and
   a third reinforcement structure part standing on the under frame to support and reinforce the seat member.

6. The railcar including the reinforcement structure according to claim 5, wherein the third reinforcement structure part has an inverted triangular sectional shape and has a lower end portion connected to the under frame and an upper side portion supporting a seat portion of the seat member.

7. The railcar including the reinforcement structure according to claim 5, wherein the third reinforcement structure has a member, provided to the under frame, extending in the longitudinal direction of the car, and having a hat-shaped section, and a first support member connecting the member and the seat member.

8. The railcar including the reinforcement structure according to claim 5, wherein the third reinforcement structure has a receiving member provided to a cross beam of the under frame and a second support member provided between the seat member and the receiving member.

9. The railcar including the reinforcement structure according to claim 1 further comprising a strap attachment having a strap bar which extends in the longitudinal direction of the car and from which a plurality of straps hang at intervals in the longitudinal direction of the car and strap bar receiving parts fixed to the roof bodyshell part to respectively support the strap bar,
   wherein the hanging members are the strap bar receiving parts of the strap attachment.

\* \* \* \* \*